United States Patent
Stills et al.

(10) Patent No.: US 6,584,692 B1
(45) Date of Patent: Jul. 1, 2003

(54) EASY RELEASE FORK

(75) Inventors: James L. Stills, Ashville, AL (US); Donald S. Outlaw, Birmingham, AL (US)

(73) Assignee: Grill Arts, LLC, Ashville, AL (US)

( * ) Notice: Subject to any disclaimer, the term of this patent is extended or adjusted under 35 U.S.C. 154(b) by 0 days.

(21) Appl. No.: 09/906,892

(22) Filed: Jul. 16, 2001

Related U.S. Application Data

(63) Continuation-in-part of application No. 09/543,193, filed on Apr. 5, 2000, now abandoned.

(51) Int. Cl.[7] .................................................. A47J 43/28
(52) U.S. Cl. ......................... 30/129; 294/99.2; D7/683
(58) Field of Search ........................... 30/322, 323, 128, 30/129; D7/683; 294/99.2

(56) References Cited

U.S. PATENT DOCUMENTS

| | | | | |
|---|---|---|---|---|
| 540,958 | A | * 6/1895 | Dow | 30/129 |
| 1,065,433 | A | * 6/1913 | Dow et al. | 30/129 |
| 1,255,945 | A | * 2/1918 | Stimecz | 30/129 |
| 1,321,594 | A | * 11/1919 | Burlingame | 294/99.2 |
| 1,432,108 | A | * 10/1922 | Johnson | 30/129 |
| 2,430,242 | A | * 11/1947 | Nichols | 30/129 |
| 3,602,541 | A | * 8/1971 | Sharpe | 30/129 |
| 4,923,234 | A | * 5/1990 | Fairley | 294/99.2 |
| 5,447,351 | A | * 9/1995 | Klunder | 294/99.2 |
| D402,860 | S | * 12/1998 | Stills | D7/683 |
| 5,934,721 | A | * 8/1999 | Walde | 294/99.2 |
| D421,880 | S | * 3/2000 | Stills | D7/683 |
| D423,304 | S | * 4/2000 | Kontour et al. | D7/683 |

FOREIGN PATENT DOCUMENTS

| | | | | |
|---|---|---|---|---|
| IT | 598021 | * 9/1959 | | 30/129 |

* cited by examiner

*Primary Examiner*—Hwei-Slu Payer
(74) *Attorney, Agent, or Firm*—Robert M. Jackson; Bush IP Law Group, LLC

(57) ABSTRACT

A food handling fork having a plurality of elongated tines having an upper surface, a lower surface, a base end, and a point and a release plate forming a plurality of tine openings through which said tines extend. The release plate has a proximal end positioned above the upper surface of the tines, a curved portion positioned below the bottom surface of the tines, and a distal end terminating in at least one tongue having a tip extending upwardly to at least the lower surface of the tines. The present invention further comprises a means for slidably advancing the release plate along the tines from an initial position where the tongue is a predetermined distance between the base end and point of the tines to a release position where at least a portion of the tongue is forward the point of the tines. In the preferred embodiment, the mechanism for slidably advancing comprises a first handle pivotally mounted to the proximal end of the release plate, a second handle connected to the base ends of the tines, and a resilient element for connecting the handles to allow the selective engagement therebetween. The present invention can be used with one hand to pick up, place, and release food in a highly controlled manner that overcomes the limitations of the prior art.

33 Claims, 11 Drawing Sheets

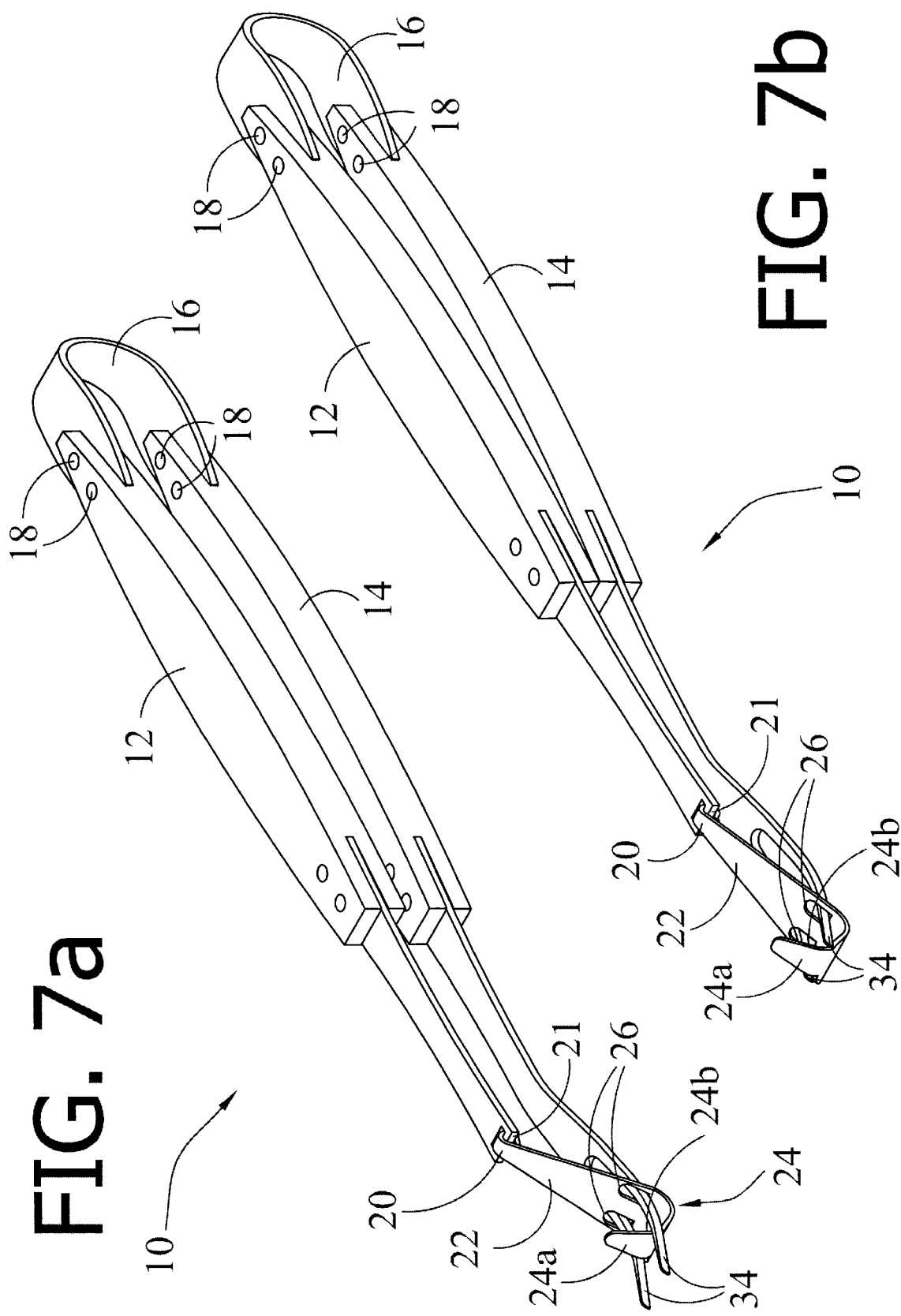

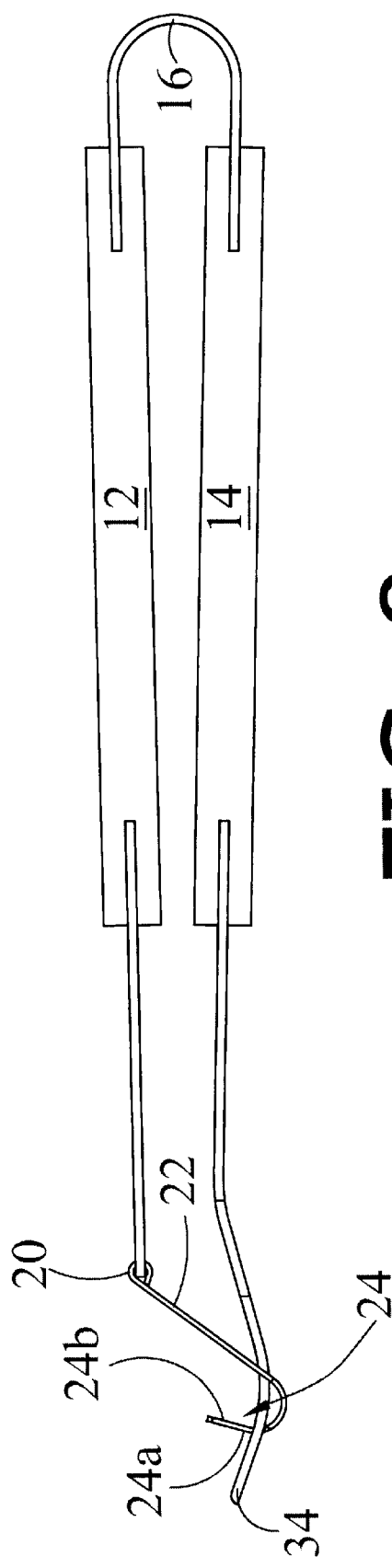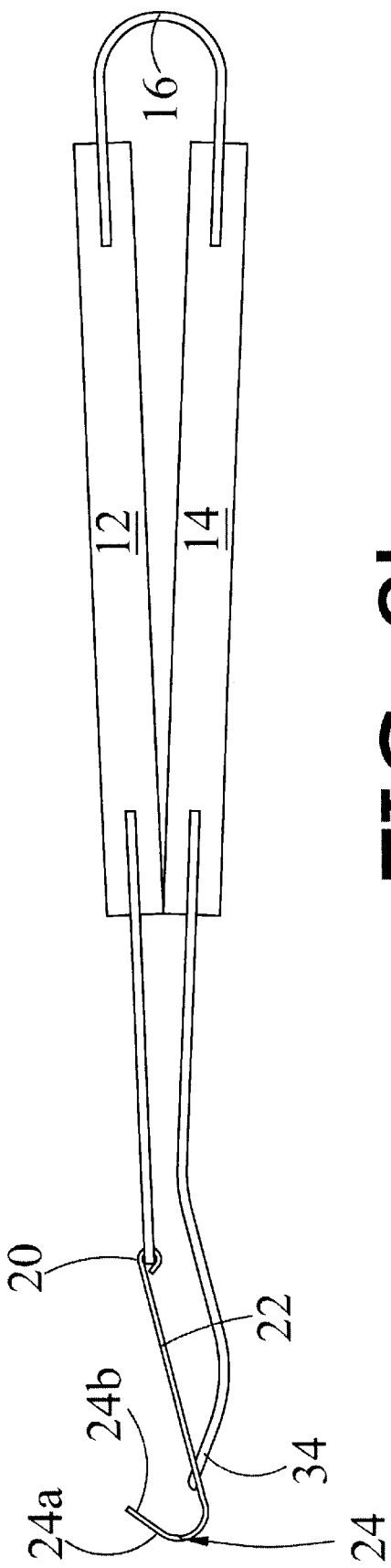

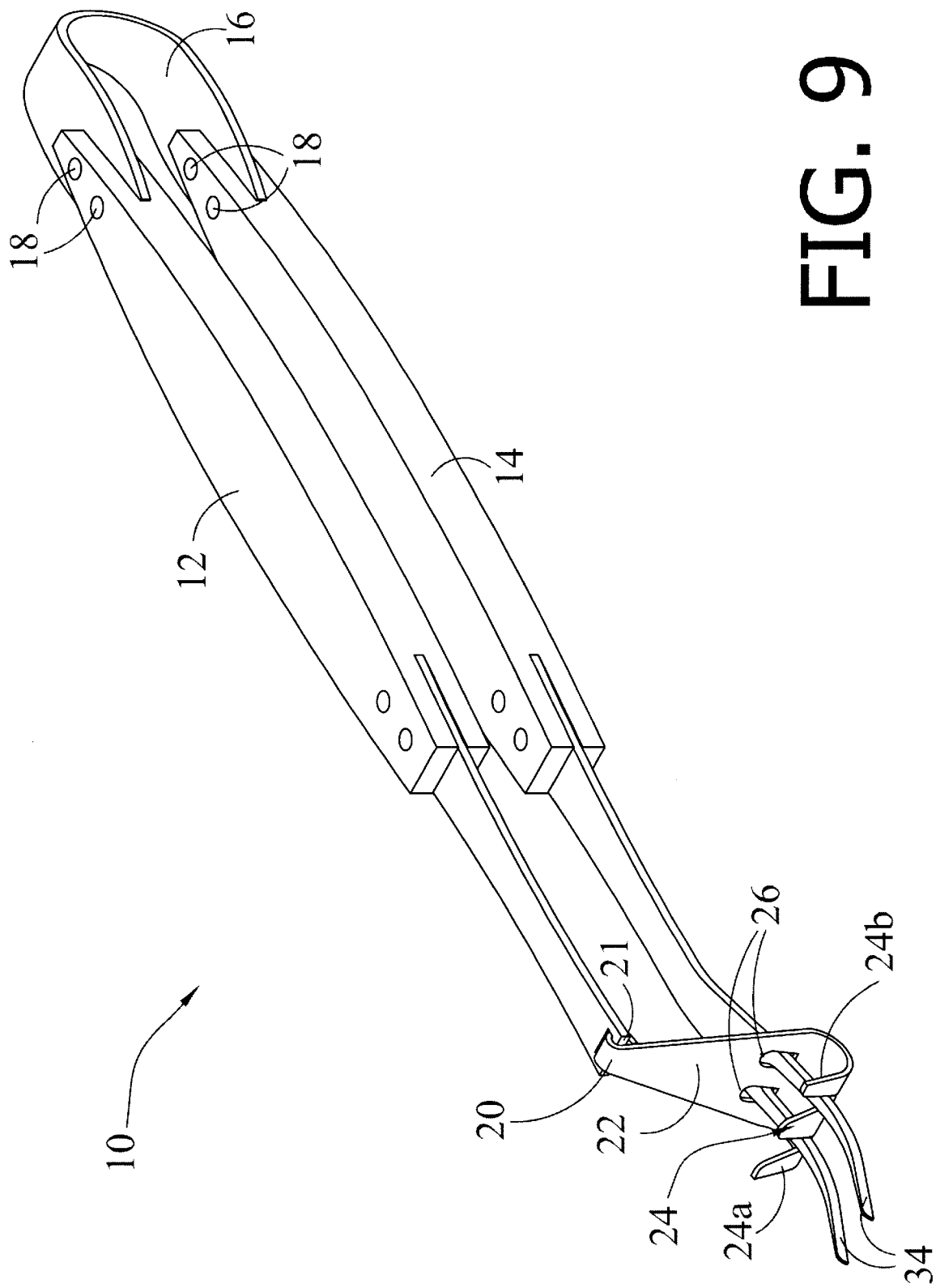

EASY RELEASE FORK

RELATED MATERIALS

The present application is a continuation-in-part application of pending U.S. patent application Ser. No. 09/543,193, filed on Apr. 5, 2000 now abandoned, which is incorporated herein by reference.

BACKGROUND AND SUMMARY OF INVENTION

The present invention relates to a food handling fork. With greater particularity, the present invention relates to a fork having a plurality of tines extending through a release plate that slidably moves along the tines to release food secured thereon as two heat resistant handles grasped in one hand are pressed together.

Food handling devices such as tongs and forks allow a user to grasp and move food without having to touch the food with his fingers. There are several dangers associated with attempting to use one's fingers to move food during the cooking process. Because food being cooked on a cooking device such as a barbecue grill or stove is extremely hot, the most obvious of these dangers is suffering a burn from contact with the cooking device or the food itself. This danger is heightened when using an outdoor barbecue because of the intense heat and the random nature of flames flaring towards the cooking surface. A less obvious, but nevertheless significant danger associated with moving food with one's fingers during the cooking process is the possibility of transferring disease-causing bacteria between the food, such as uncooked meat, and the user's hands. These dangers are reduced by the use of forks and tongs that allow food to be moved in a controlled manner while keeping the user's hands and fingers a safe distance from the cooking device and the food itself.

The conventional barbecue fork is generally straight, allowing the user to hold the fork by a handle on one end, and to secure food of various shapes and textures using two or more tines extending from the opposite end. To secure and move food utilizing a fork, typically only one hand is needed. In many cases, however, food secured and moved by the fork is not readily releasable from a conventional fork, and this is a significant design limitation of conventional forks. To release objects secured by the tines of a conventional force, the user often resorts to the use of a second utensil, which must then be cleaned. In a more reflexive manner, to avoid using a second utensil the user may resort to awkward motions with abrupt changes in direction to release the object secured by the tines, which reduces the user's control over the manner in which an object is released. In some cases, the user reflexively resorts to using his fingers to brace the object secured on the tines and then remove the tines from the object. This manner of releasing objects secured by a fork having a conventional design increases the likelihood that the user will suffer a burn or spread contamination from contacting food with their fingers.

An additional disadvantage associated with using a second utensil or the user's fingers to brace food for releasing an object from the tines of a conventional fork, is the necessity of the user employing two hands for removing food from a fork. A barbecue cook often does not have his second hand free to remove food from a fork, such as, for example, the situation where the cook is holding a tray in one hand and a food handling fork in the other. If the second hand of a user is not free, and the user is having difficulty removing an object from the tines of a conventional fork, the cook is more likely to resort in a reflexive manner to attempting to release objects from the fork using awkward, abrupt motions. Although a user may release food from a fork in this manner, this method of removing food from a barbecue fork utilizing one hand is unsatisfactory.

The conventional fork design relies to a large extent on gravity and shaking by the user to remove objects from the tines. This method of removing food from a conventional barbecue fork does not allow the user to have a high level of control over the manner and location in which food is released. Thus, the existing methods of releasing food from a conventional barbecue fork can result in the unwanted splashing of grease as food is abruptly release from the fork, causing dangerous and messy cooking conditions. Conventional barbecue forks do not allow the user to gently place food in a specific location on a plate or grill in an easy, controlled manner.

Therefore, the need exists for an improved food handling fork that can be used with one hand to easily release food from the tines of a fork in a controlled manner.

SUMMARY OF THE PRESENT INVENTION

With the foregoing in mind, it is the principal object of the present invention to provide a food handling fork that easily releases food secured by the fork.

It is a further object of this invention to provide a food handling fork that allows food to be released from a fork utilizing one hand.

An additional object of this invention is to provide a fork capable of releasing food secured by the fork that is easy to operate.

Another object of this invention is to provide a food handling fork that allows food to be released from the fork while keeping the user's hands and fingers a safe distance from the food and cooking device to prevent the user's hands and fingers from being burned.

A still further object of this invention is to provide a food handling fork that allows food to be released from the fork while keeping the user's hands and fingers a safe distance from the food and cooking device to prevent the transfer of disease-causing bacteria between the food and the user's hands.

Another object of this invention is to provide a fork capable of securing, moving, and releasing a variety of articles in a controlled manner.

An additional object of this invention is to provide a fork that easily releases a variety of articles from the tines of the fork without damaging the articles.

Another object of this invention is to provide a fork having a plurality of tines, a release plate used to release objects from the tines, and two handles that are used to control the selective movement of the release plate along the tines.

Another object of this invention is to provide a fork made of simple construction, which achieves the stated objectives in a simple, effective, and inexpensive manner and which solves the problems and satisfies the needs existing in the art.

These and other objects of the present invention are accomplished through the use of a food handling fork having a plurality of tines with a release plate forming a plurality of openings through which the tines of the fork project. The tines and release plate of the present invention are connected to a pair of handles that when pressed together cause the release plate to slidably move toward the ends of the tines, causing food secured by the tines to be released therefrom. The release plate extends below the tines and terminates in at least one tongue positioned between the tines. The tines are connected to and longitudinally extend from one of the handles. The release plate member is pivotally connected at its proximal end to an extension plate member extending longitudinally from the other handle. Pressing the two handles together causes the release plate member to selectively advance along the tines toward the ends of the tines.

The handles of the food handling fork of the present invention are designed for use with one hand, which eliminates the need to lift and release food from the food handling fork using a second utensil or the user's fingers. The present invention eliminates the awkward maneuvering necessary for releasing food from conventional barbecue forks. Further, because the release plate can be selectively moved to a release position wherein a portion of the release plate is forward the ends of the tines, the easy release fork may operate in essentially any orientation and does not rely on gravity to remove food from the tines. The release plate of the present invention may be operated to push food from the tines in a highly controlled manner with the fork positioned in an upward, downward, or horizontal orientation. Further, the outward movement of the forward facing surface of the release plate not only overcomes the limitations of the prior art by allowing the food to be released in a highly controlled manner without the necessity of utilizing gravity or awkward movements, it also overcomes the limitations of the prior art by gently releasing food without pinching it or mashing it. Thus, it can be appreciated that an easy release fork of the present invention may be used to effectively handle food without damaging delicate foods such as, for instance, olives or cheese.

The present invention allows a user to release objects from a fork where and when desired, while minimizing damage to the food as it is released from the fork. It can be appreciated from the following description of the preferred embodiment and the drawings referenced therein that the easy release fork of the present invention can be used with one hand to pick up, place, and release food in a highly controlled manner that overcomes the limitations of the prior art.

BRIEF DESCRIPTION OF THE DRAWINGS

An easy release fork assembly embodying the features of the present invention is depicted in the accompanying drawings which form a portion of this disclosure and wherein:

FIG. 7a is a second perspective view of the preferred embodiment of an easy release fork assembly;

FIG. 7b is a third perspective view of the preferred embodiment of an easy release fork assembly;

FIG. 8a is a second left side elevational view of the preferred embodiment of an easy release fork assembly;

FIG. 8b is a third left side elevational view of the preferred embodiment of an easy release fork assembly;

FIG. 9 is a perspective view of a second embodiment of an easy release fork assembly;

DESCRIPTION OF THE PREFERRED EMBODIMENT

Figure 1:
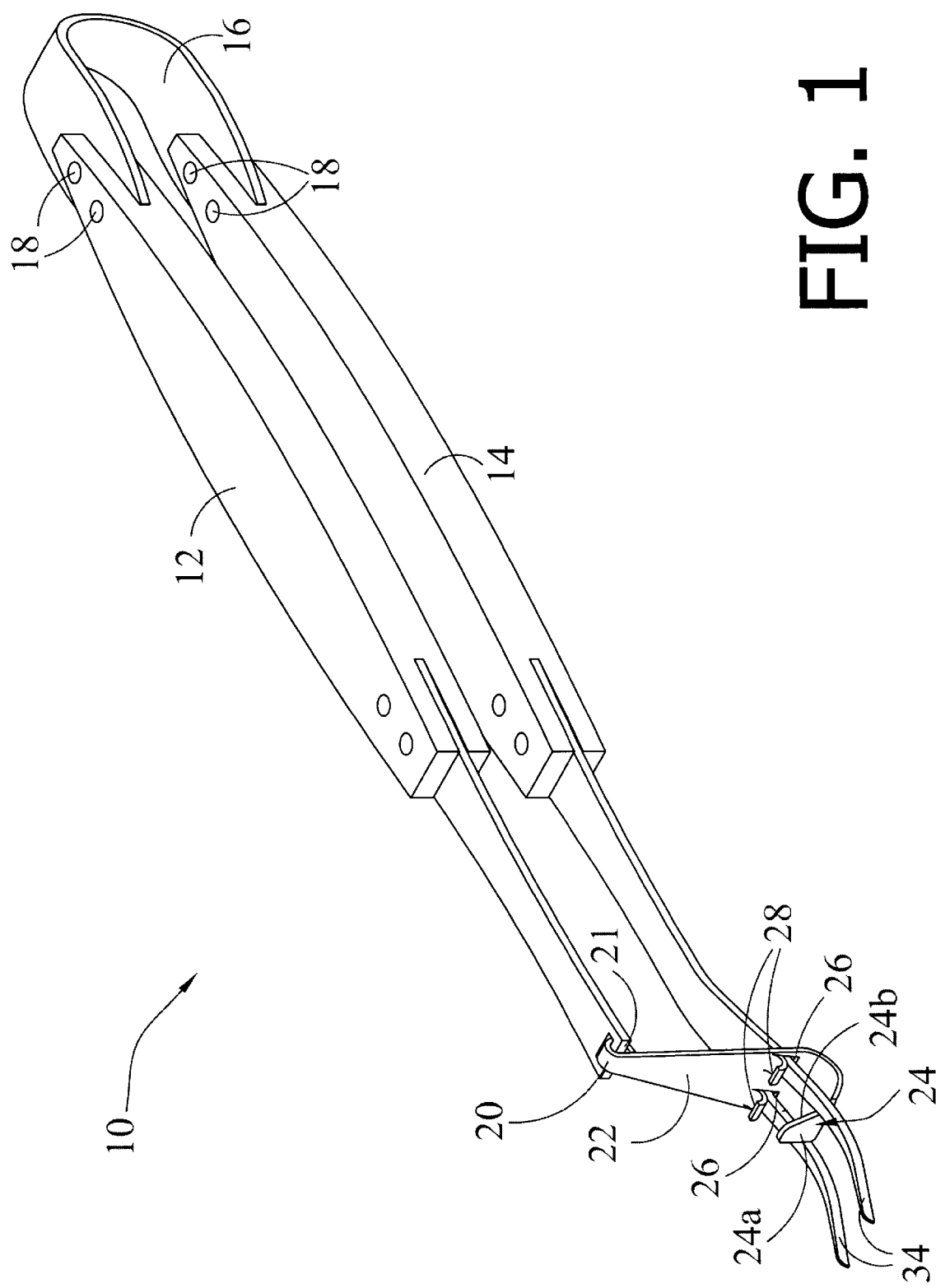
FIG. 1 is a perspective view of the preferred embodiment of an easy release fork assembly.
Figure 2:
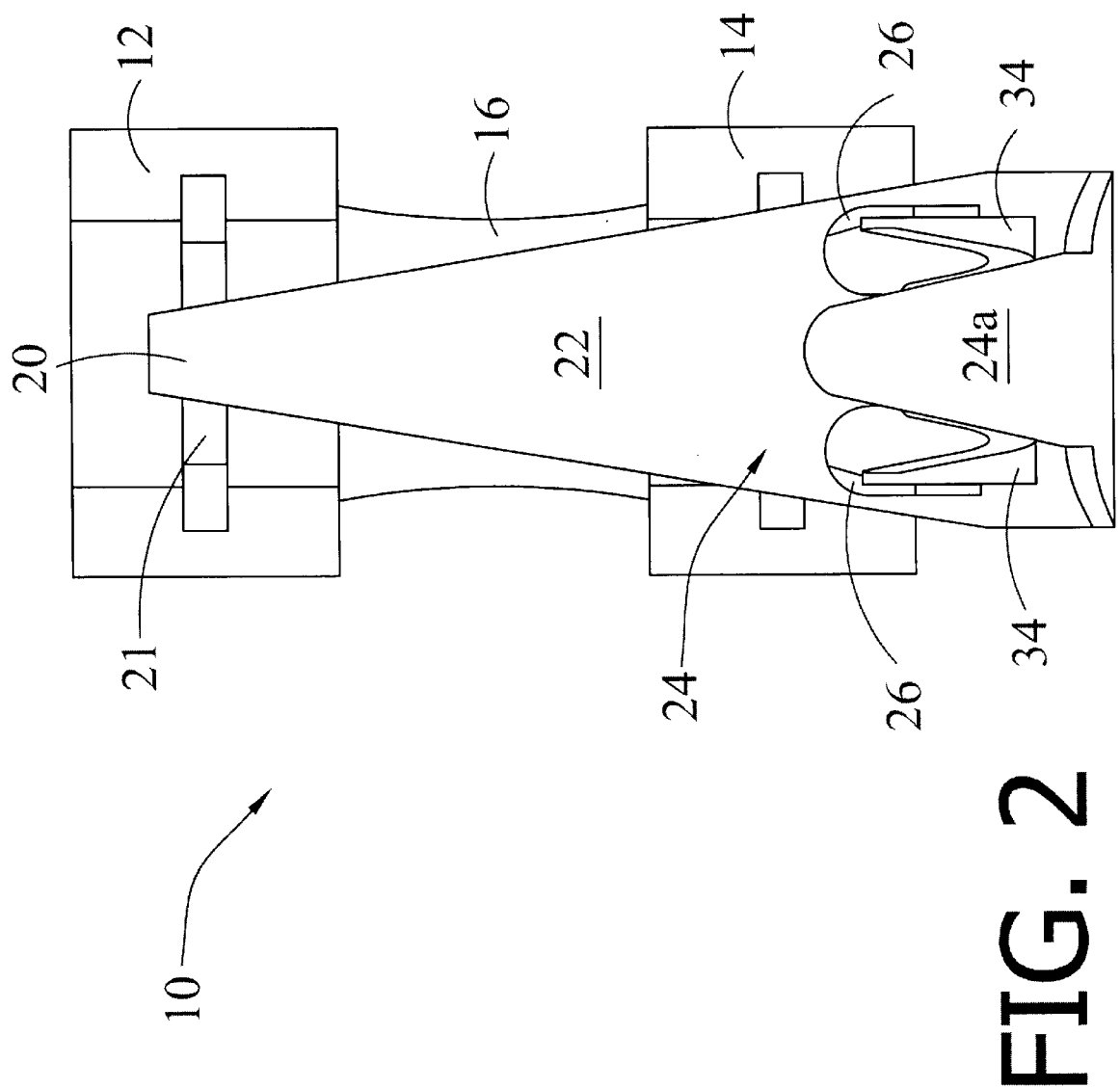
FIG. 2 is a front elevational view of the preferred embodiment of an easy release fork assembly.
Figure 3:
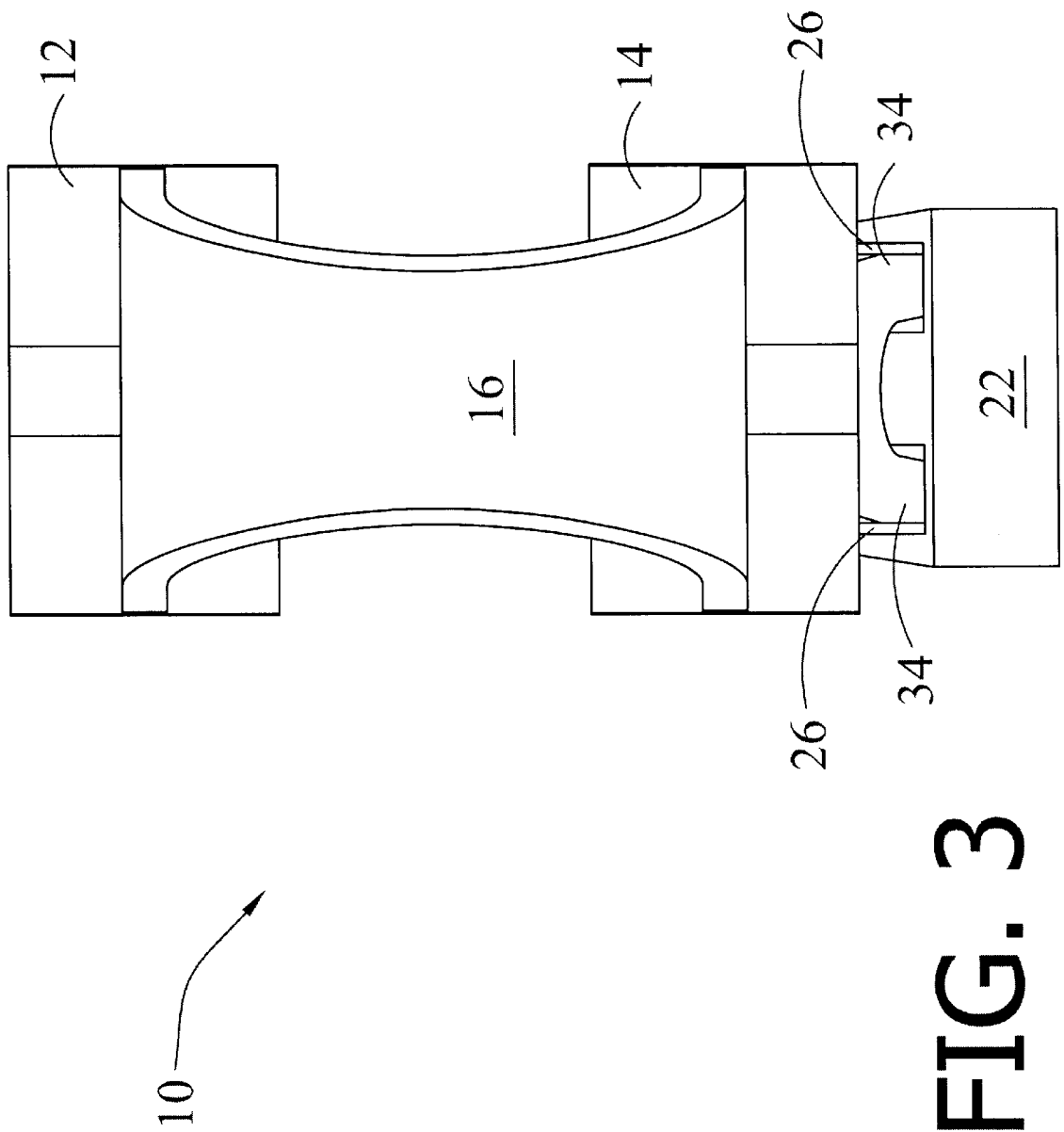
FIG. 3 is a rear elevational view of the preferred embodiment of an easy release fork assembly.
Figure 4:
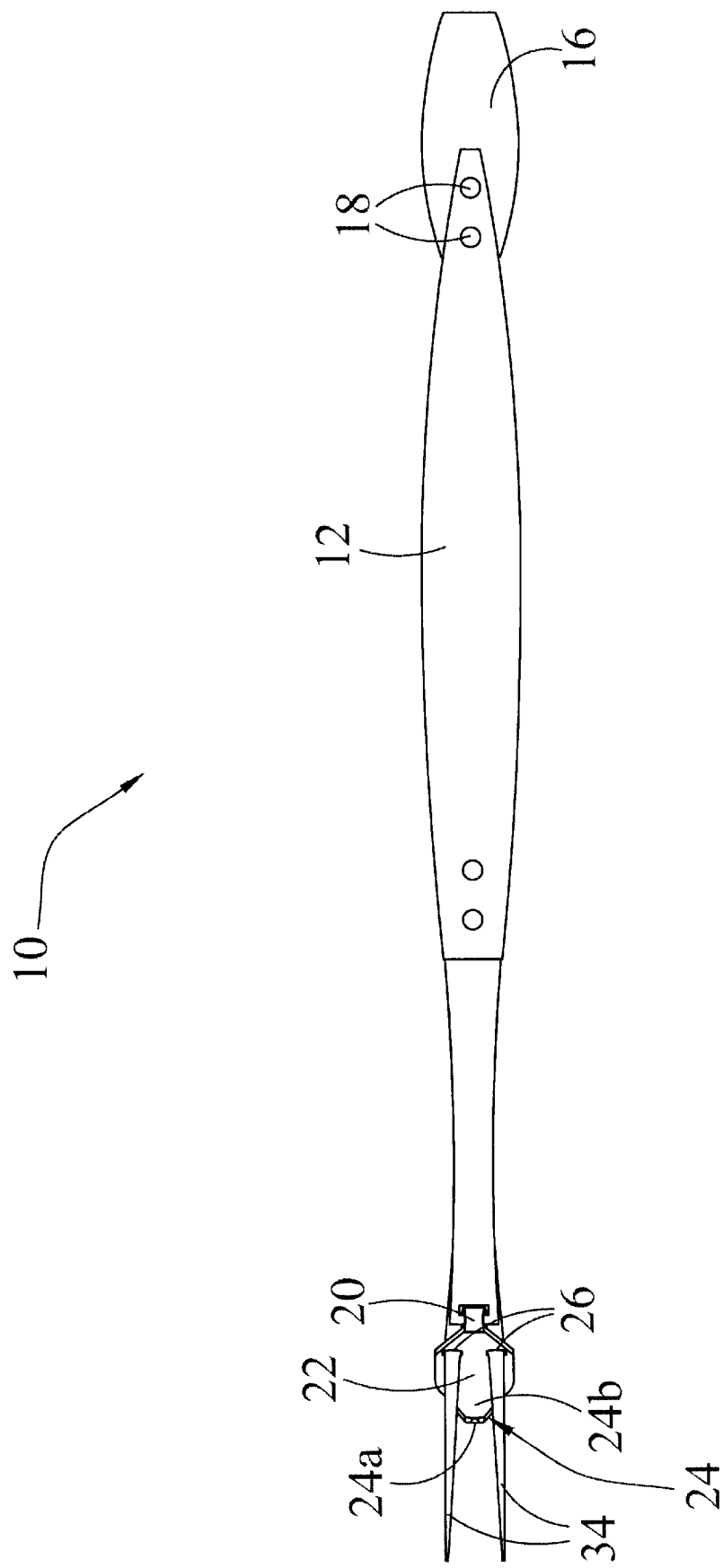
FIG. 4 is a top plan view of the preferred embodiment of an easy release fork assembly.
Figure 5:
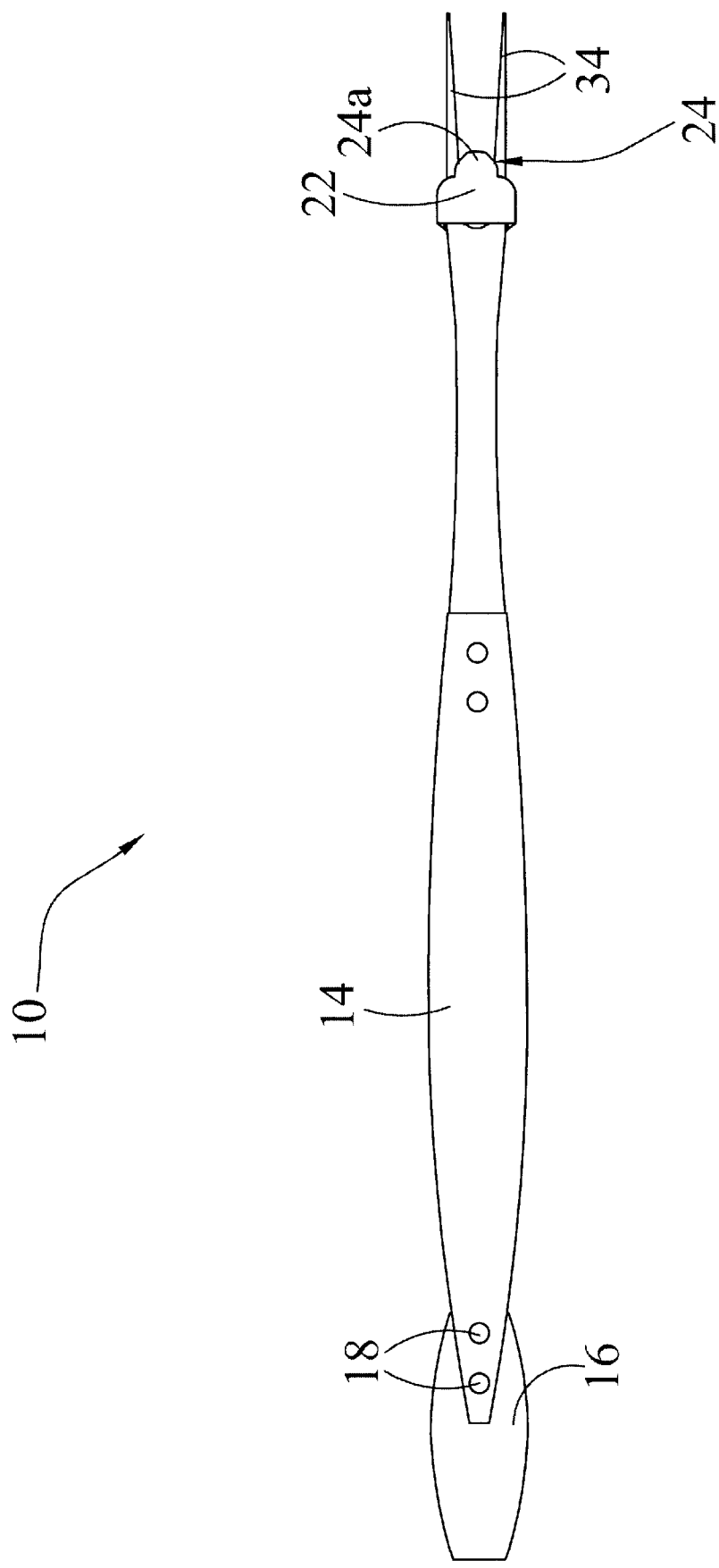
FIG. 5 is a bottom plan view of the preferred embodiment of an easy release fork assembly.
Figure 6:
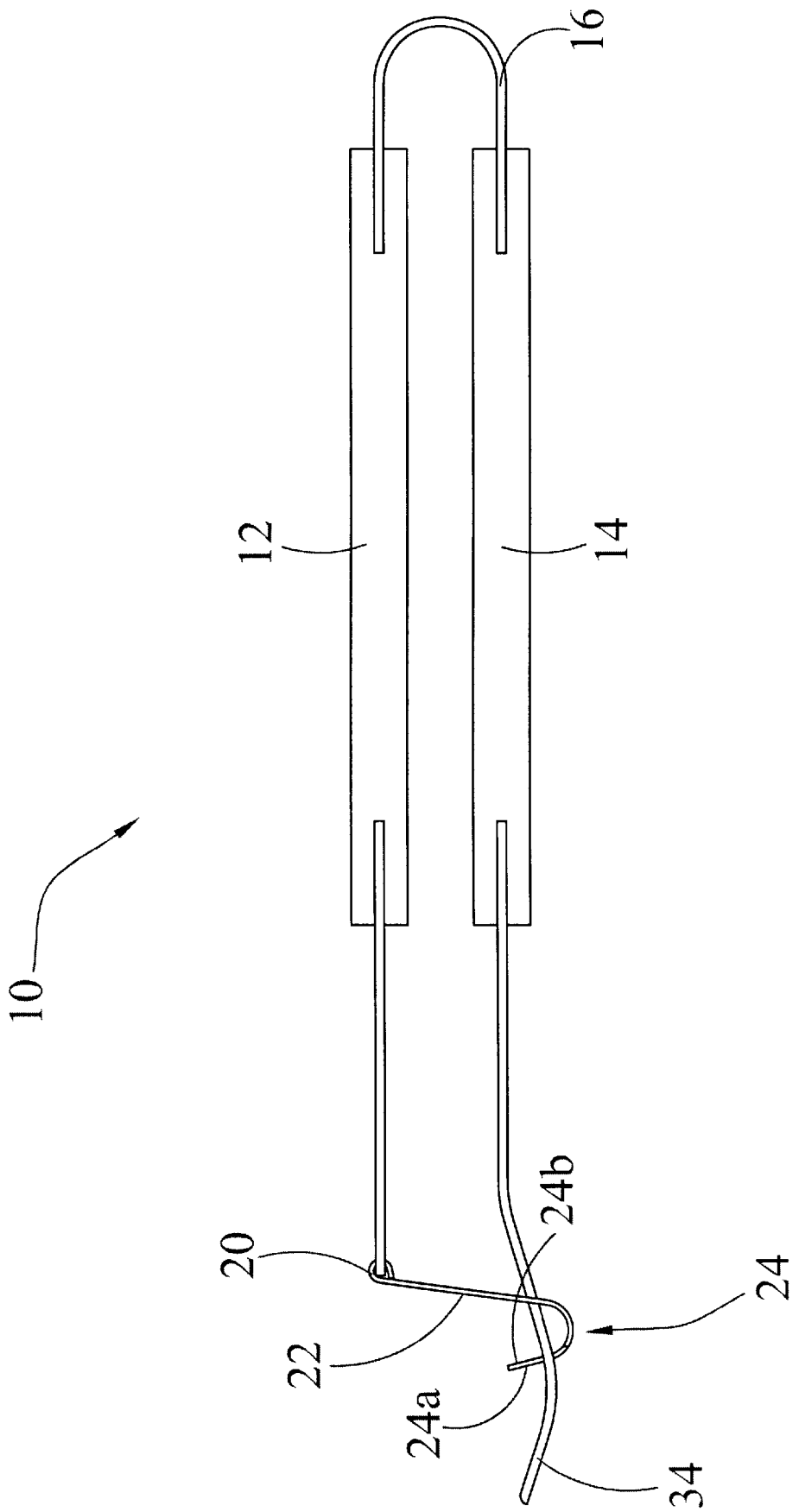
FIG. 6 is a left side elevational view of the preferred embodiment of an easy release fork assembly, the right side elevational view being a mirror image thereof.
Figure 10:
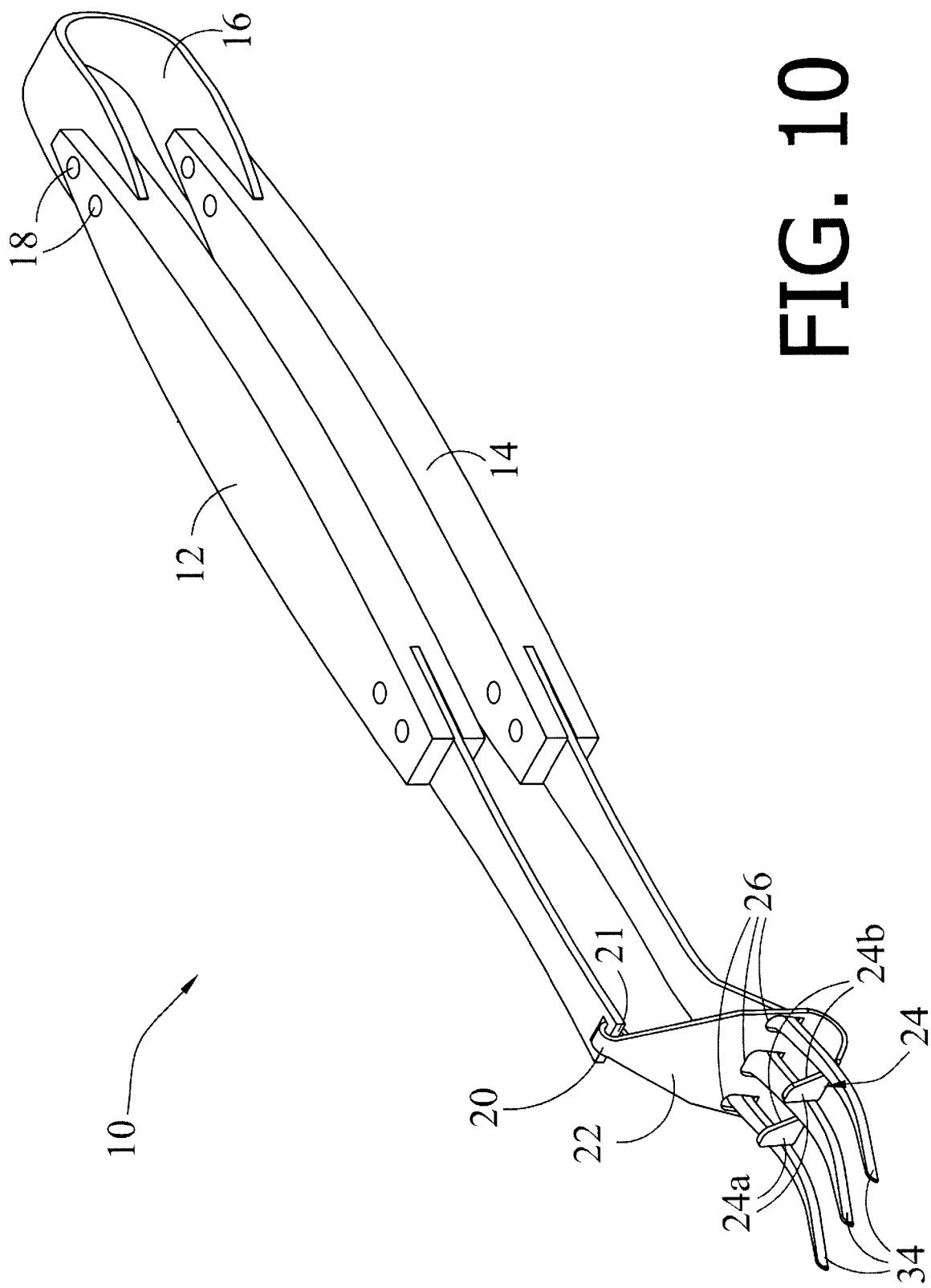
FIG. 10 is a perspective view of a third embodiment of an easy release fork assembly.

Referring to FIGS. 1–11 for a clearer understanding of the invention, it may be seen that the preferred embodiment of the easy release fork 10 comprises a first elongated handle 12 having a forward end and a back end, and a second elongated handle 14 having a forward end and a back end. The present invention further comprises resilient means for connecting the first and second elongated handles 12, 14 with the first handle 12 being spaced a predetermined distance above the second handle 14. At least a portion of the first and second handles 12, 14 are comprised of heat-resistant material.

In the preferred embodiment, resilient means for connecting comprises a spring clip 16 being a resilient member curved into a substantially U-shape having two ends connected by a radial fulcrum. The first end of the spring clip 16 is connected to the back end of the first handle 12 and the second end of the spring clip 16 is connected to the back end of the second handle 14. In the preferred embodiment, the first and second handles 12, 14 have horizontal voids defined therein that slidably receive the ends of the spring clip 16. A pair of rivets 18 fixedly attaches each end of the spring clip 16 to the corresponding ends of the first and second handles 12, 14. As shown in the attached drawings, the spring clip 16 maintains the first handle 12 spaced a predetermined distance from the second handle 14, allowing the easy release fork 10 of the present invention to be grasped and engaged by a user with one hand. The handles 12, 14 of the easy release fork 10 are engaged by selectively pressing them together and disengaged by selectively releasing them, as shown in FIGS. 6, 7A, 7B, 8A, and 8B. By the selective engagement of the handles 12, 14, shown by comparing FIGS. 6, 8A, and 8B, the release plate 22 is slidably moveable along the tines 34 from an initial position to a release position. The resilient means for connecting, in the preferred embodiment the spring clip 16 in the preferred embodiment, returns the handles 12, 14 to an initial position when the handles are released.

The release plate 22 has a proximal end and a distal end, and is pivotally connected at its proximal end to the forward end of the first handle 12 to allow the release plate 22 to be selectively advanced along the tines 22 as the handles 12, 14 are engaged. In the preferred embodiment, the means for pivotally connecting the proximal end of the release plate 22 to the forward end of the first handle 12 comprises a loop 20 formed on the proximal end of the release plate 22 circumscribing a pin 21 formed on the forward end of the first handle 12, to form a hinge. Other means for pivotally connecting the release plate 22 to the first handle 12 that are well known in the art, such as other types of hinges, may be utilized.

The distal end of the release plate 22 terminates in at least one tongue 24 having a forward facing surface 24a and an upwardly extending tip 24b. The release plate 24 further comprises a plurality of tine openings 26 defined therein and a plurality of upturned arcuate flaps 28 defining an upper portion of the tine openings 26.

The easy release fork 10 further comprises a plurality of elongated tines 34 extending longitudinally from the forward end of the second handle 14. The tines 34 have an upper surface, a lower surface, a base end, and a point. In the preferred embodiment, the tines 34 are arcuate. The tines 34 of the present invention may also have other shapes well known in the art, such as being substantially straight. The tines 34 extend through the tine openings 26 defined in the release plate 22, and the proximal end of the release plate 22 is positioned above the upper surface of the tines 34. The release plate 22 has a curved portion positioned below the lower surface of the tines 34, and a distal end terminating in at least one tongue 24 having a tip extending upwardly to at least the lower surface of the tines 34. In the preferred embodiment, the tongue 24 is positioned between the tines 34 and the tip extends above at least the upper surface of the tines 34. The preferred embodiment further comprises a plurality of upturned arcuate flaps 28 having an arcuate bottom surface for sliding engagement with the upper surface of the tines 34.

When the handles 12, 14 and release plate 22 are in the initial position, the tongue 24 is a predetermined distance between the base end of the tines 34 and the point. When the handles 12, 14 are pressed together by a user, the release plate 22 being pivotally mounted to the first handle 12 is slidably advanced along the tines 34 from the initial position toward the ends of the tines 34. In this manner, the handles 12, 14 and means for connecting the handles 12, 14 provide a means for selectively advancing the release plate 22 along the tines 34. As shown by comparing FIGS. 6, 8A, and 8B, the location of the release plate 22 relative to the ends of the tines 34 varies with the extent to which the handles 12, 14 are pressed together, or engaged. With the handles 12, 14 pressed together, as shown in FIGS. 7B and 8B, the release plate is in a release position wherein at least a portion of the forward facing surface 24a of the tongue is forward of the ends of the tines 34. The outward movement of the forward facing surface 24a of the tongues to a position forward the point of the tines 34 releases food secured by the tines 34. Further, the outward movement of the tongue 24 to a position forward the end of the tines 34 releases food in a highly controlled manner without damaging the food by pinching or mashing.

Figure 11:
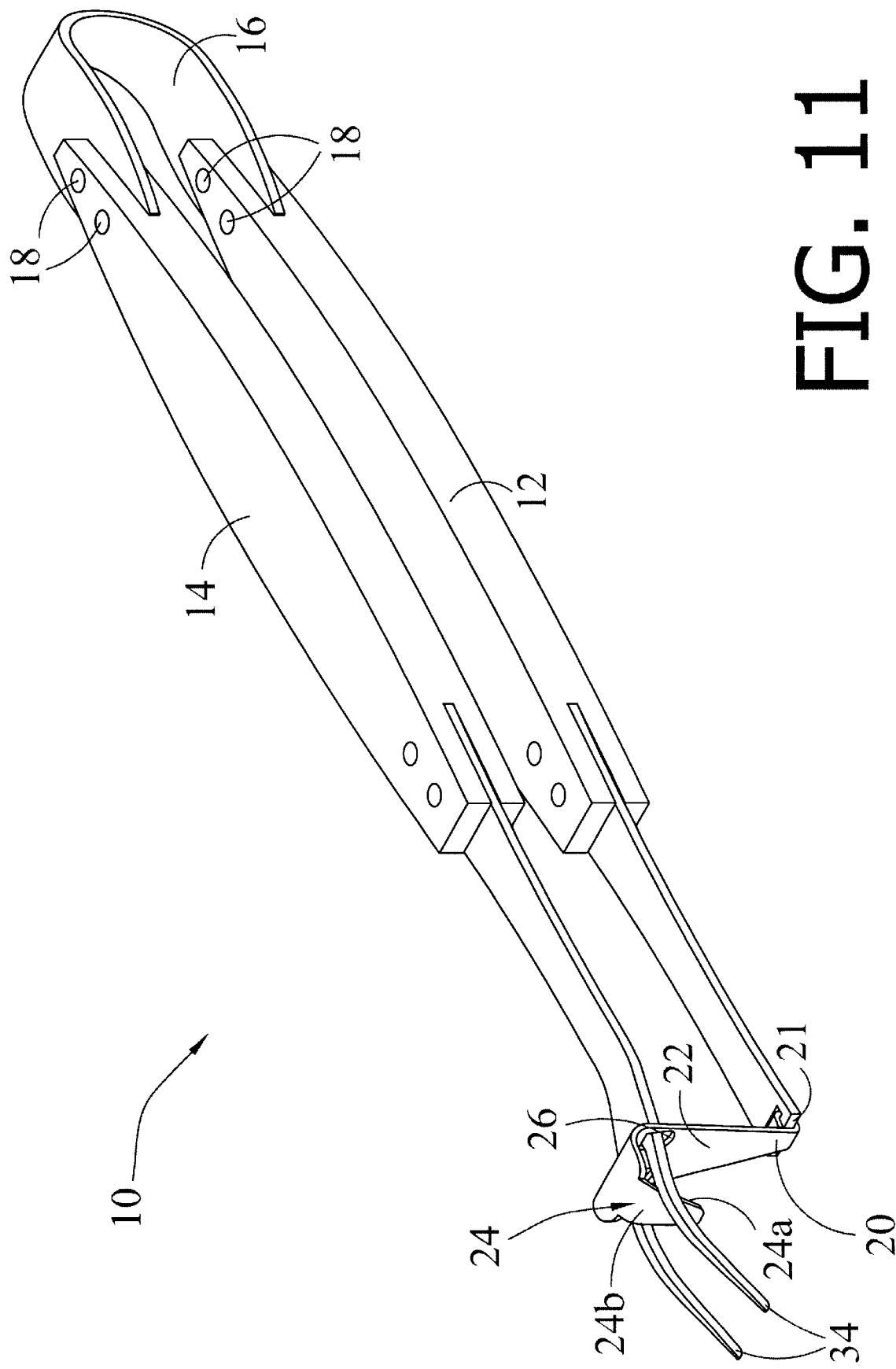
FIG. 11 is a bottom perspective view of the preferred embodiment of an easy release fork assembly.

The preferred embodiment of the present invention, as shown in FIG. 1, comprises an easy release fork 10 having a pair of tines 34 and a single upwardly extending tongue 24 positioned between the tines 34. Other embodiments may alternatively utilize a different number of tongues 24, such as the second embodiment of the present invention shown in FIG. 9, which utilizes three tongues 24, or the third embodiment of the present invention shown in FIG. 10, which utilizes two tongues 24. Additional embodiments of the present invention may utilize a different number of tines 34, such as the third embodiment of the present invention shown in FIG. 10, which utilizes three tines 34. As shown in FIG. 11, the present invention may be readily operated in the reverse vertical orientation with the second handle 14 positioned above the first handle 12. It can be appreciated that the operation of the easy release fork and the movement of the release plate allows a user to pick up, place, and release objects in a highly controlled manner. The user of an easy release fork of the present invention may release objects therefrom where and when desired.

It is to be understood that the form of the invention shown is a preferred embodiment thereof and that various changes and modifications may be made therein without departing from the spirit of the invention or scope as defined in the following claims.

What is claimed is:

1. An easy release fork assembly comprising:
    a) a first elongated handle having a forward end and a back end;
    b) a second elongated handle having a forward end and a back end;
    c) resilient means for connecting said first handle and said second handle with said first handle being spaced a predetermined distance from said second handle;
    d) a plurality of tines extending longitudinally from said forward end of said second handle, said tines having an upper surface and a lower surface,
    e) a release plate having a plurality of tine openings defined therein through which said tines extend, said release plate terminating in at least one tongue having a portion positioned below said lower surface of said tines and a tip extending upwardly to at least said upper surface of said tines, wherein said at least one tongue is positioned between said tines and,
    f) means for pivotally connecting said release plate to said forward end of said first elongated handle so that said release plate is selectively advanced along said tines as said first handle and said second handle are pressed together.

2. An easy release fork assembly as described in claim 1, wherein said release plate can be selectively advanced to a release position wherein at least a portion of said tongue is forward of said tines.

3. An easy release fork assembly as described in claim 2 wherein said release plate further comprises a plurality of upturned arcuate flaps defining an upper portion of said plurality of tine openings, said flaps slidably engaging said upper surface of said tines.

4. An easy release fork assembly as described in claim 2 wherein said release plate has a proximal end and said means for pivotally connecting comprises a hinge.

5. An easy release fork assembly as described in claim 2 wherein said means for pivotally connecting comprises a pin formed on said forward end of said first handle and a loop formed on a proximal end of said release plate circumscribing said pin.

6. An easy release fork assembly as described in claim 2 wherein said resilient means comprises a resilient member formed into a U-shape having a first end connected to said back end of said first handle, and a second end connected to said back end of said second handle.

7. An easy release fork assembly as described in claim 2 wherein at least a portion of said first handle and said second handle is comprised of heat-resistant material.

8. An easy release fork assembly as described in claim 2 wherein said tines are arcuate.

9. An easy release fork assembly as described in claim 2 wherein said tines are substantially straight.

10. An easy release fork assembly comprising,
    a. a plurality of elongated tines having an upper surface, a lower surface, a base end, and a point,
    b. a release plate forming a plurality of tine openings through which said tines extend, said release plate having a proximal end positioned above said upper surface, a curved portion positioned below said lower surface, and a distal end terminating in at least one tongue having a tip extending upwardly to at least said lower surface, wherein said at least one tongue is positioned between said tines and said tip extends above said upper surface of said tines, and c. means for selectively advancing said release plate along said tines from an initial position where said tongue is at a predetermined distance between said base end and said point, to a release position where at least a portion of said tongue is forward said point of said tines.

11. An easy release fork assembly as described in claim 10 wherein said release plate further comprises a plurality of flaps defining an upper portion of said plurality of tine openings, said flaps having an arcuate bottom surface for sliding engagement with said upper surface of said tines.

12. An easy release fork assembly as described in claim 11 wherein said tines are arcuate.

13. An easy release fork assembly as described in claim 11 wherein said tines are substantially straight.

14. An easy release fork assembly as described in claim 11 wherein said means for selectively advancing comprises a first handle having a forward end connected to said base end, a second handle having a forward end pivotally mounted to the proximal end of said release plate, and resilient means for connecting said first handle a predetermined distance above said second handle.

15. An easy release fork assembly as described in claim 14 wherein said second handle is pivotally mounted to said release plate utilizing a hinge.

16. An easy release fork assembly as described in claim 14 wherein said first handle has a back end, said second handle has a back end, and said resilient means comprises a resilient member formed into a U-shape having a first end connected to said back end of said first handle, and a second end connected to said back end of said second handle.

17. An easy release fork assembly as described in claim 14 wherein said second handle is pivotally mounted to said release plate utilizing a pin formed on said forward end of said second handle and a loop formed on the proximal end of said release plate circumscribing said pin to form a hinge.

18. An easy release fork assembly as described in claim 14 wherein at least a portion of said first handle and at least a portion of said second handle are comprised of heat-resistant material.

19. A easy release fork assembly comprising:
a) a first elongated handle having a forward end and a back end;
b) a second elongated handle having a forward end and a back end;
c) resilient means for connecting said first handle and said second handle with said first handle being spaced a predetermined distance from said second handle;
d) a plurality of tines extending longitudinally from said forward end of said second handle, said tines having an upper surface and a lower surface,
e) a release plate having a plurality of tine openings defined therein through which said tines extend, and a plurality of upturned arcuate flaps defining an upper portion of said plurality of tine openings, said flaps slidably engaging said upper surface of said tines, said release plate terminating in at least one tongue having a portion positioned below said lower surface of said tines and a tip extending upwardly to at least said lower surface of said tines, and,
f) means for pivotally connecting said release plate to said forward end of said first elongated handle so that said release plate is selectively advanced along said tines as said handles are pressed together to a release position wherein at least a portion of said tongue is forward of said tines.

20. An easy release fork assembly as described in claim 19 wherein said means for pivotally connecting comprises a hinge.

21. An easy release fork assembly as described in claim 19 wherein said means for pivotally connecting comprises a pin formed on said forward end of said first handle and a loop formed on a proximal end of said release plate circumscribing said pin.

22. An easy release fork assembly as described in claim 19 wherein said resilient means comprises a resilient member formed into a U-shape having a first end connected to said back end of said first handle, and a second end connected to said back end of said second handle.

23. An easy release fork assembly as described in claim 19 wherein at least a portion of said first handle and said second handle is comprised of heat-resistant material.

24. An easy release fork assembly as described in claim 19 wherein said tines are arcuate.

25. An easy release fork assembly as described in claim 19 wherein said tines are substantially straight.

26. An easy release fork assembly comprising,
a. a plurality of elongated tines having an upper surface, a lower surface, a base end, and a point,
b. a release plate forming a plurality of tine openings through which said tines extend and a plurality of flaps defining an upper portion of said plurality of tine openings, said flaps having an arcuate bottom surface for sliding engagement with said upper surface of said tines, said release plate having a proximal end positioned above said upper surface, a curved portion positioned below said lower surface, and a distal end terminating in at least one tongue having a tip extending upwardly to at least said lower surface, and
c. means for selectively advancing said release plate along said tines from an initial position where said tongue is at a predetermined distance between said base end and said point, to a release position where at least a portion of said tongue is forward said point of said tines.

27. An easy release fork assembly as described in claim 26 wherein said means for selectively advancing comprises a first handle having a forward end connected to said base end, a second handle having a forward end pivotally mounted to the proximal end of said release plate, and resilient means for connecting said first handle a predetermined distance above said second handle.

28. An easy release fork assembly as described in claim 27 wherein said second handle is pivotally mounted to said release plate utilizing a hinge.

29. An easy release fork assembly as described in claim 27 wherein said first handle has a back end, said second handle has a back end, and said resilient means comprises a resilient member formed into a U-shape having a first end connected to said back end of said first handle, and a second end connected to said back end of said second handle.

30. An easy release fork assembly as described in claim 27 wherein said second handle is pivotally mounted to said release plate utilizing a pin formed on said forward end of said second handle and a loop formed on the proximal end of said release plate circumscribing said pin to form a hinge.

31. An easy release fork assembly as described in claim 27 wherein at least a portion of said first handle and at least a portion of said second handle are comprised of heat-resistant material.

32. An easy release fork assembly as described in claim 26 wherein said tines are arcuate.

33. An easy release fork assembly as described in claim 26 wherein said tines are substantially straight.

* * * * *